US007264465B2

(12) United States Patent
Schwaiger et al.

(10) Patent No.: US 7,264,465 B2
(45) Date of Patent: Sep. 4, 2007

(54) INJECTION MOLD

(75) Inventors: Ernst Schwaiger, Micheldorf (AT);
Erich Mitteregger, Micheldorf (AT)

(73) Assignee: IFW-Manfred Otte Gesellschaft m.b.H. & Co. KG, Micheldorf (AT)

( * ) Notice: Subject to any disclaimer, the term of this patent is extended or adjusted under 35 U.S.C. 154(b) by 114 days.

(21) Appl. No.: 11/182,832

(22) Filed: Jul. 18, 2005

(65) Prior Publication Data

US 2006/0018994 A1   Jan. 26, 2006

(30) Foreign Application Priority Data

Jul. 26, 2004   (EP)   .................................. 04017638

(51) Int. Cl.
*B29C 45/44*   (2006.01)
(52) U.S. Cl. ................ 425/577; 425/438; 425/DIG. 58
(58) Field of Classification Search ................ 425/556, 425/577, 438, DIG. 58
See application file for complete search history.

(56) References Cited

U.S. PATENT DOCUMENTS 4,708,632 A * 11/1987 Mitteregger et al. ........ 425/556
5,217,731 A *  6/1993 Fallent ....................... 425/556
5,494,434 A *  2/1996 Schwaiger et al. ......... 425/577
6,435,857 B1 * 8/2002 Mitteregger et al. ........ 425/556

FOREIGN PATENT DOCUMENTS

| AT | 402376 | * | 4/1997 |
| DE | 94 14 523.7 | | 12/1994 |
| EP | 0 548 823 A1 | | 6/1993 |
| EP | 0 630 734 A1 | | 12/1994 |

* cited by examiner

*Primary Examiner*—James P. Mackey
(74) *Attorney, Agent, or Firm*—Wenderoth, Lind & Ponack, L.L.P.

(57) ABSTRACT

An injection mold for producing, from thermoplastic plastic, fittings which have an annular groove on the inside. The injection mold includes an outer mold, divided into a first and second mold half and along a parting line, and a mold core being axially displaceable along a mold half. A complementary mold bead for forming the annular groove is formed by levers carrying ring segments. A slider, which bridges the parting plane of the outer mold and is connected to the second mold half, has guide grooves of differing obliqueness, in which there engage motionally lateral projections both of the mold core and of the actuating element. A guide, which extends the opening stroke of the mold core, is formed at a distance from the parting plane, between the slider and at least the mold core, the guide preferably comprising second, lateral projections and second guide grooves.

8 Claims, 6 Drawing Sheets

INJECTION MOLD

BACKGROUND OF THE INVENTION

The invention relates to an injection mold for producing, from thermoplastic plastic, fittings or the like, which have at least one annular groove on the inside. The injection mold includes an outer mold which is divided into a first and second mold half and along a parting plane, and a mold core which is axially displaceable along the first mold half of the outer mold and on which there is formed, for forming the annular groove, a complementary mold bead consisting of ring segments carried by levers. The injection mold also includes an actuating element for swivelling the levers being disposed in an axially displaceable manner in the mold core, and a slider, which bridges the parting plane of the outer mold, being connected to the second mold half and having guide grooves, of differing obliqueness, and having engaged therewith motionally lateral projections both of the mold core and of the actuating element, said projections being disposed on the parting plane.

In EP 548 823 A it is disclosed that the extraction and insertion of the mold core is motionally coupled to the opening and closing of the outer mold. Provided for this purpose there is a slider which bridges the parting plane of the outer mold and has two lateral plates comprising guide grooves engaged with projections of the mold core and the actuating element.

In order to extend the opening stroke, an embodiment makes provision whereby the guide grooves are formed in a telescopically extensible element.

According to DE 94 15 523 U, which discloses an injection mold of the type stated at the outset, the actuating element for prior swivelling of the levers of the mold bead is also included in the motional coupling between the slider and the mold core.

Since, in the closed position, the greatest forces have to be introduced into the mold core at the start of the opening stroke, the projections are disposed on both sides in an axial plane of the fitting to be demolded, in which the parting plane of the outer mold is located. This arrangement ensures an axial introduction of force from the slider moving perpendicular to said parting plane. These projections, at the end of the opening stroke, are located at the end of the guide slots. The extent of the slider is limited in its direction of motion by the maximum possible extent of the overlap over the parting plane when the mold is in the closed position.

SUMMARY OF THE INVENTION

The object of the invention, therefore, is to achieve a greater opening stroke of a mold core in a simple manner. This is achieved, according to the invention, in that a guide, which extends the opening stroke of the mold core, is formed at a distance from a parting plane and between a slider and at least the mold core. The additional guide becomes effective only at the end of the usual unmodified opening stroke. The dimension of the slider is not enlarged in its direction of motion, but instead a longer opening motion of the slider becomes possible, until the guide disposed at a distance from the parting plane has attained its functional end.

A second guide likewise comprises lateral projections on the mold core and guide grooves, wherein transposal of this arrangement is also possible.

A provision is made, in a preferred embodiment, whereby second lateral projections engage in second guide grooves which extend parallel to first guide grooves in lateral plates of the slider. This arrangement facilitates an extended guidance, particularly if two projections are also provided on the actuating element, since the disposition of the projections and the allocation of the guide grooves can be optimally matched to the spatial conditions. In principle, however, it is conceivable for the first and second projections to slide, one behind the other and at a distance from one another, in the same guide grooves.

One guide slot per projection is a prerequisite for a further preferred embodiment. In this embodiment the width of initial portions of the second guide grooves, wherein the initial portions correspond with the first guide grooves, is greater than the diameter of the second projections. As a result, an introduction of force into the actuating element and into the mold core during the longer first portion of the opening stroke is accomplished exclusively and centrally via the first projections. This occurs because the second projections do not bear on the walls of the second guide grooves. The second guide grooves taper at the transition to the extension guide, and the second projections take over the further guidance of the mold core for the end portion of its opening stroke, while the first projections come out of the first guide grooves, which widen from the transition onwards and preferably end in the form of a funnel.

The second projections and the second guide grooves in the slider are preferably assigned to the actuating element for swivelling the levers which form the mold bead. As a result, the slider has four guide grooves which are parallel in pairs on each plate, and a respective projection for the guide extension is provided at a distance from the parting plane and on the mold core and the actuating element.

The extension guide on the actuating element can also be omitted, since the additional axial displacement of the actuating element is not necessary once the levers have been swivelled inwards and the annular groove in the fitting has been released. In this case, the distance that develops, at the start of the opening stroke, between the mold core and the actuating element would lessen again during the extension stroke.

DESCRIPTION OF THE DRAWINGS

Further details of the invention are now explained with reference to the drawings, wherein.

DETAILED DESCRIPTION OF THE INVENTION

Figure 1:
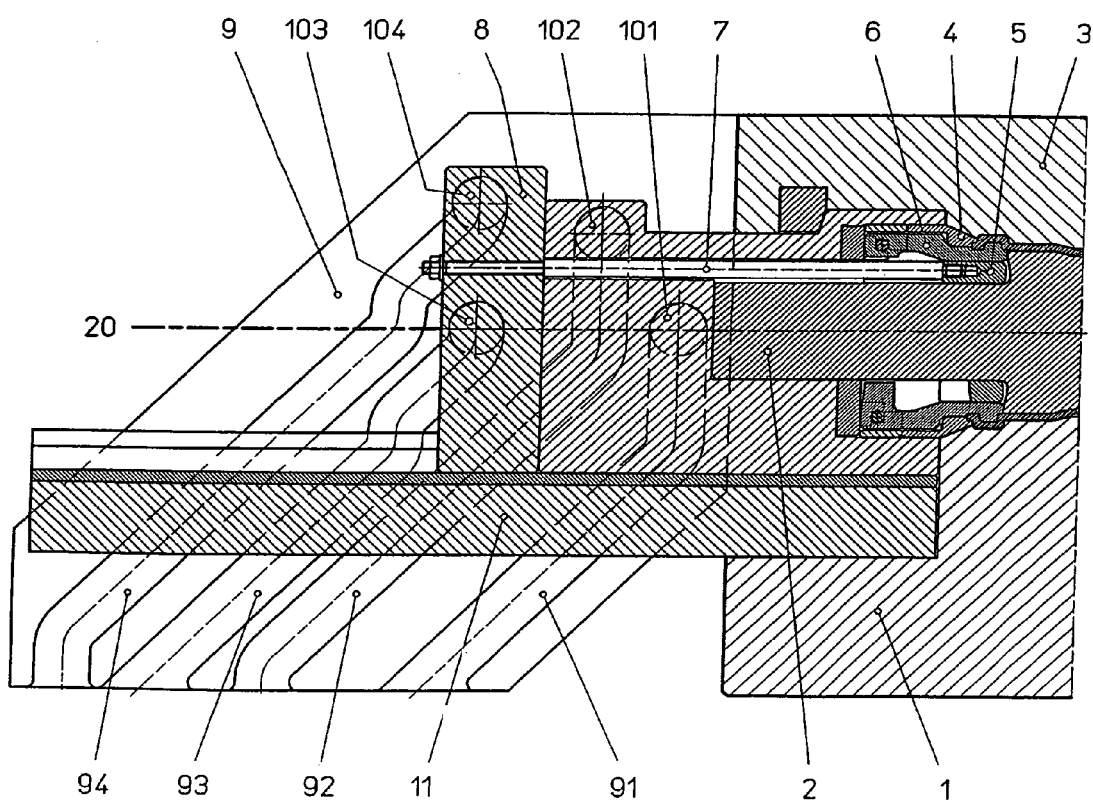
FIG. 1 shows a longitudinal section through a closed injection mold.

An injection mold consists of an upper (first) mold half 3 and a lower (second) mold half 1, the upper mold half 3 being divided from the lower mold half 1 along a parting plane 20, and able to be raised upwards. Connected to the upper mold half 3 is a slider 14 (FIG. 2), whose two lateral plates 9, in the closed mold according to FIG. 1, project as far downwards as the lower mold half 1. First lateral projections 101, 103 provided laterally on mold core 2 and actuating element 8 are guided in first guide grooves 91, 93 of the two lateral plates 9, respectively. The mold core 2 consists of an inner part and of an outer part which encompasses the former in the manner of a sleeve, and which is firmly connected to a mold ring 4 (plurality of ring segments).

Figure 2:
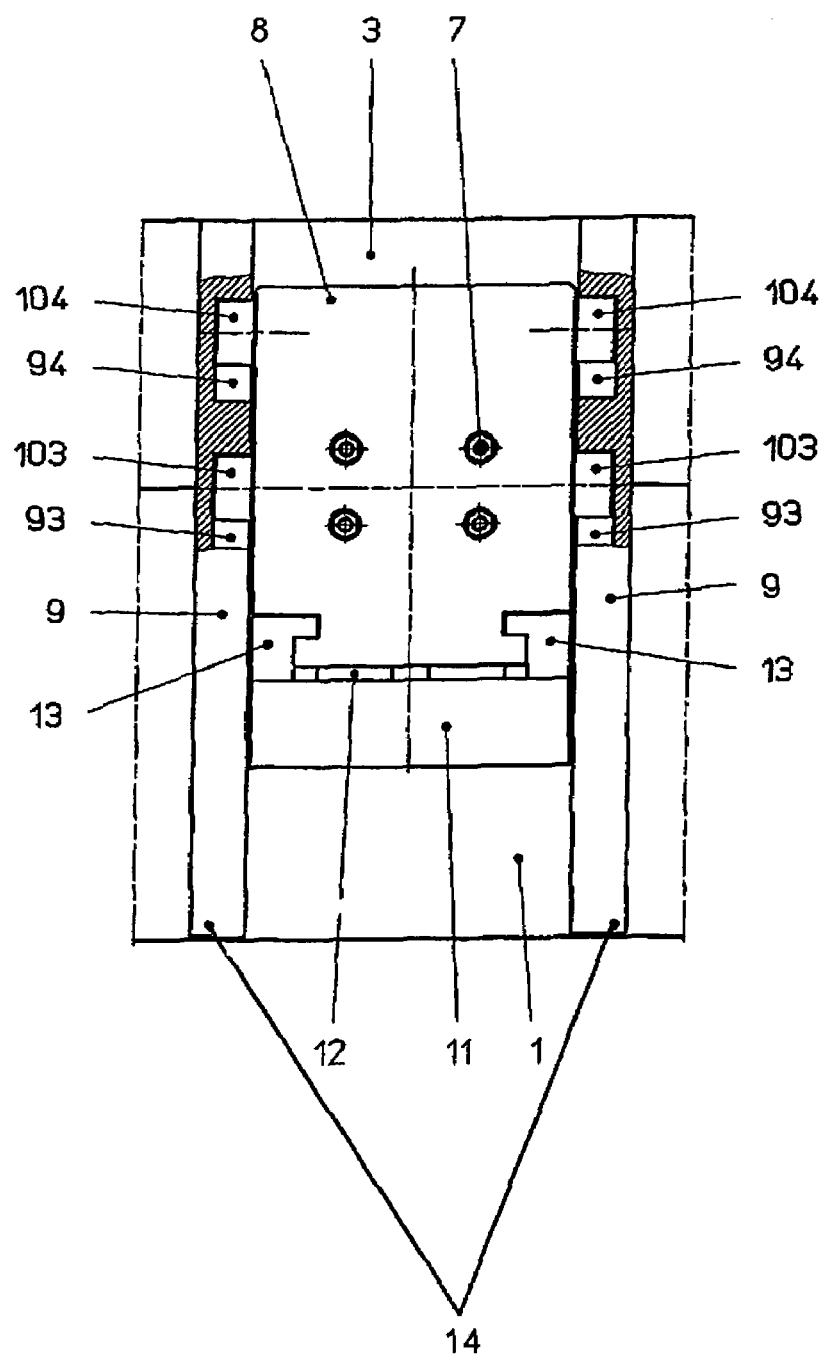
FIG. 2 shows a partially sectional view from the left of the claimed injection mold of FIG. 1.

Levers 6 are disposed in a circle and have ring segments on their outer ends to form an annular core bead when the levers 6 are swivelled-out according to FIG. 1. When the levers 6 are in the swivelled-out state, their inside is supported by a locking ring 5. This locking ring 5 can be actuated by at least one tie rod 7, which participates in the motion of the actuating element 8.

Figure 3:
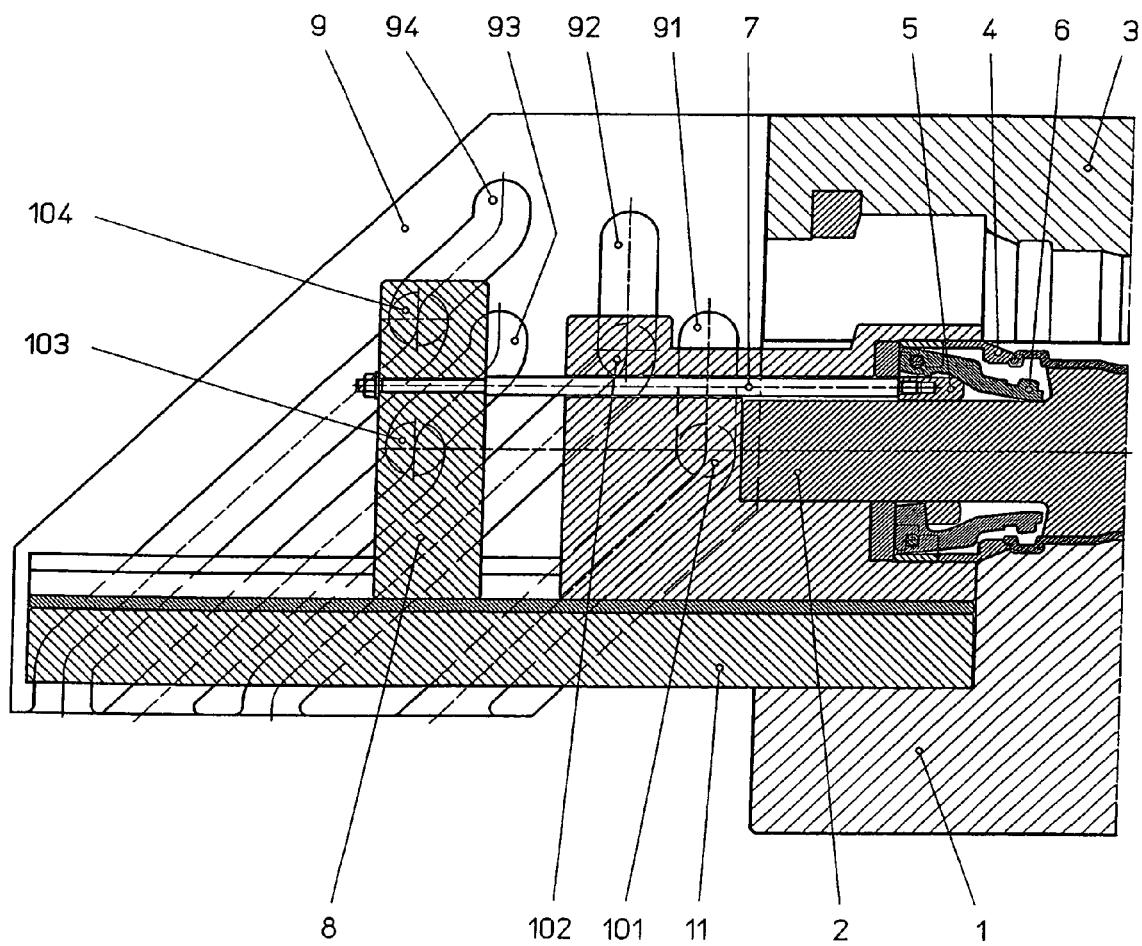
FIG. 3 shows a section, corresponding to FIG. 1, following the release of the levers of the mold bead.

If the upper mold half 3 is raised from the lower mold half 1, the first guide grooves 91, 93 in the two lateral plates 9 move relative to the first lateral projections 101, 103. This results, firstly, as shown by FIG. 3, in a displacement of the actuating element 8 on a slide strip 12 of the lower mold half 1. Slide angles 13 (FIG. 2) prevent the actuating element 8 from being raised during this displacement. The transition from the position according to FIG. 1 to that according to FIG. 3 causes the locking ring 5 to be displaced relative to the levers 6. The levers 6 are thereby folded inwards, since the locking ring 5 strikes against the orthogonally projecting second arm of the levers 6. The mold core 2 can then be axially displaced.

Figure 4:
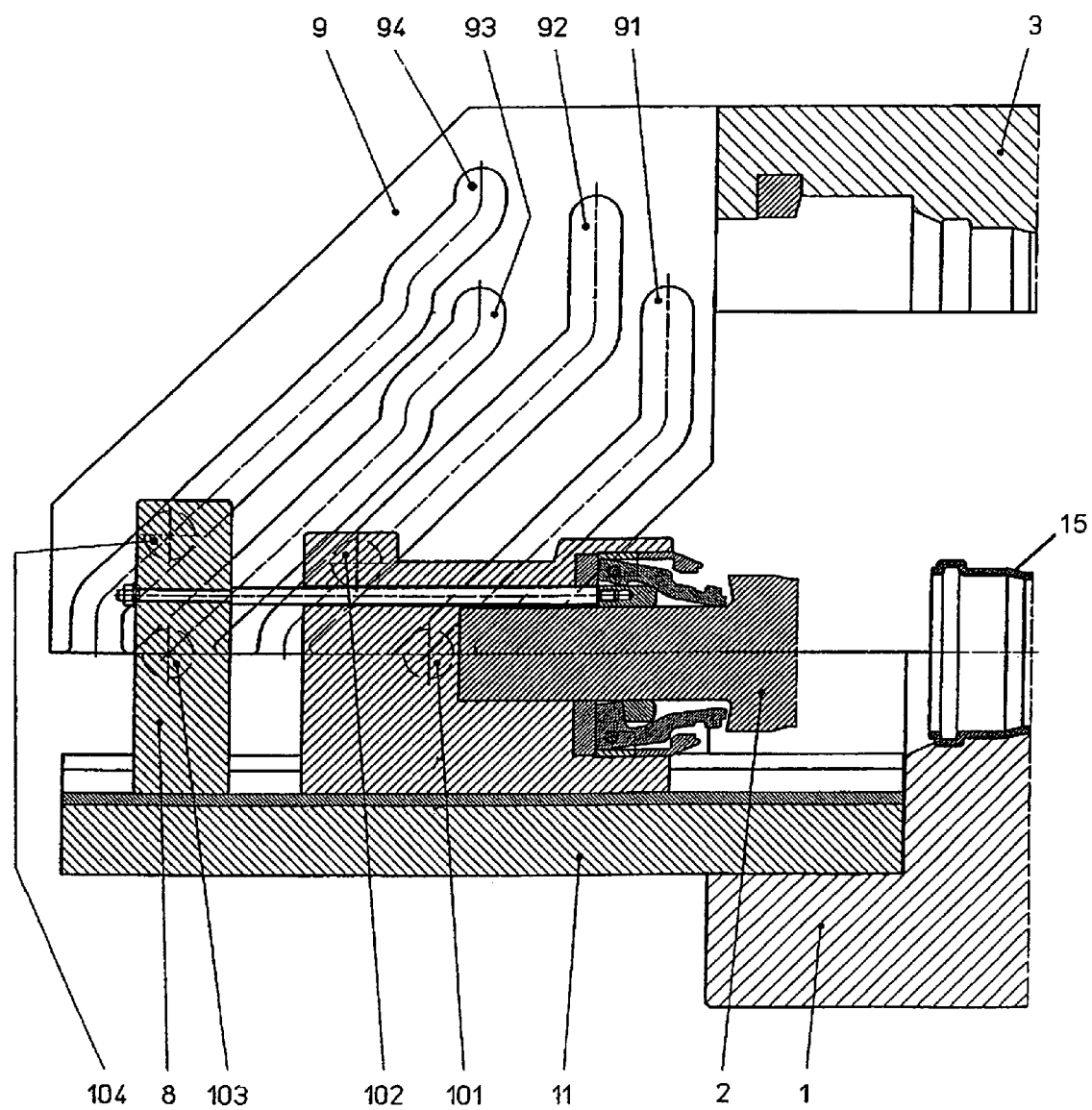
FIG. 4 shows the section corresponding to FIG. 1, with a mold core displaced over a first portion of the opening stroke.

If the upper mold half 3 moves out of the position according to FIG. 3 into that according to FIG. 4, the mold core is also displaced, together with the mold ring 4 encompassing the levers 6, as a result of which the injection-molded part 15 is fully released. As evident from FIG. 4, in this position the first lateral projections 101, 103 are at the lower end of the slider 14 that is raised with the upper mold half 3 and, upon further raising of the upper mold half 3, they come out of the first guide grooves 91, 93, such that they cannot effect any further displacement of the mold core 2 and of the actuating element 8. The plate 9 is therefore provided with second guide grooves 92, 94, which respectively have initial portions 96, 98, which run parallel to the first guide grooves 91, 93, respectively and end portions which extend the guide. Since the second guide grooves 92, 94 likewise end at the lower edge of the plate 9, their start is located higher than the start of the first guide grooves 91, 93.

Figure 5:
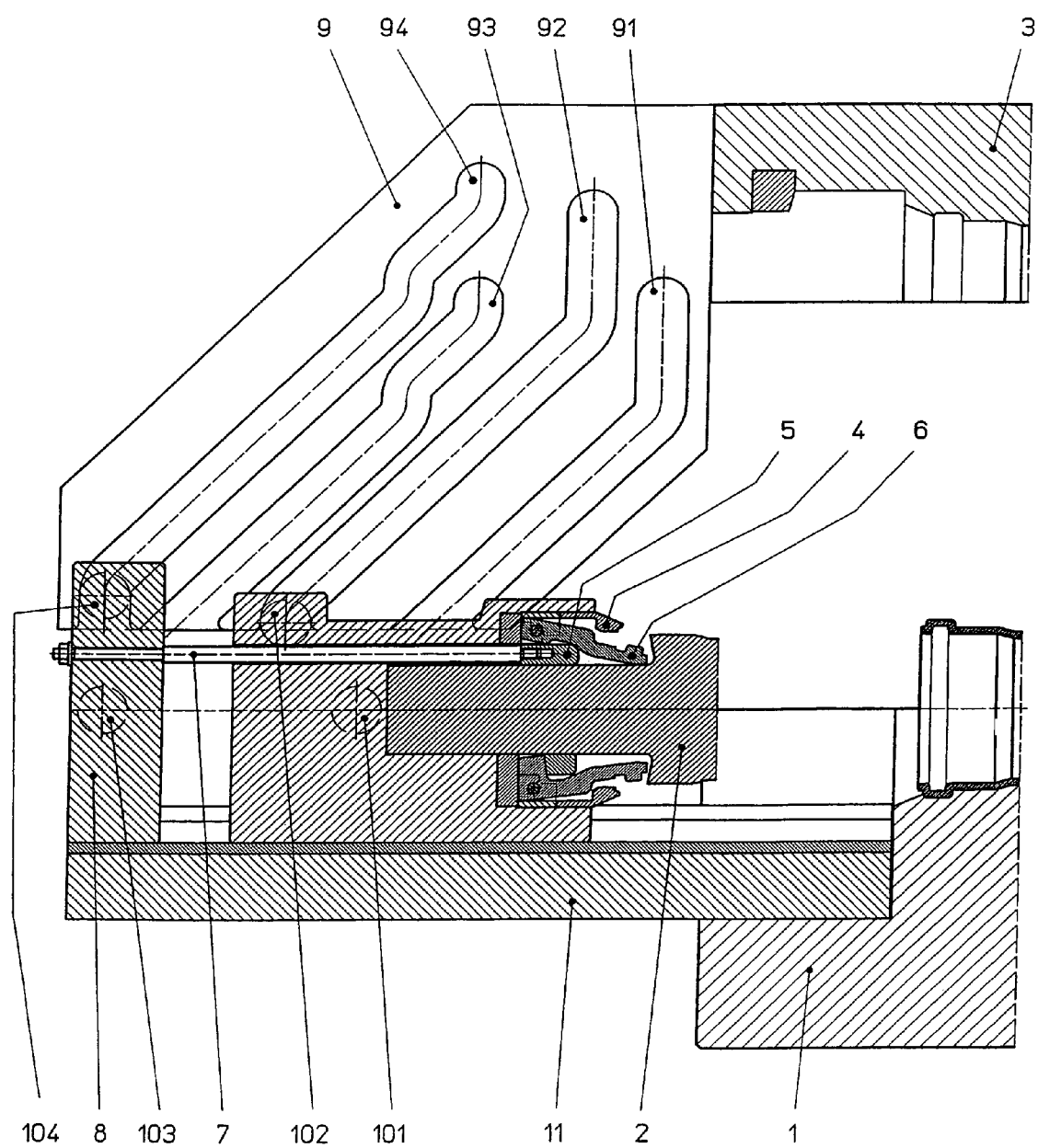
FIG. 5 shows the section corresponding to FIG. 1, in the extended end position.

Second lateral projections 102, 104, which are disposed at a distance from the parting plane 20, above the first lateral projections 101, 103 on the mold core 2 and on the actuating element 8, engage in the second guide grooves 92, 94. As shown by FIG. 4, when the first lateral projections 101, 103 come out of the first guide grooves 91, 93, the second lateral projections 102, 104 are at the transition from the initial portion 96, 98 to the end portion 97, 99, and take over the further guidance of the mold core 2 and the actuating element 8 to the end of the extended opening stroke, as evident from FIG. 5.

Figure 6:
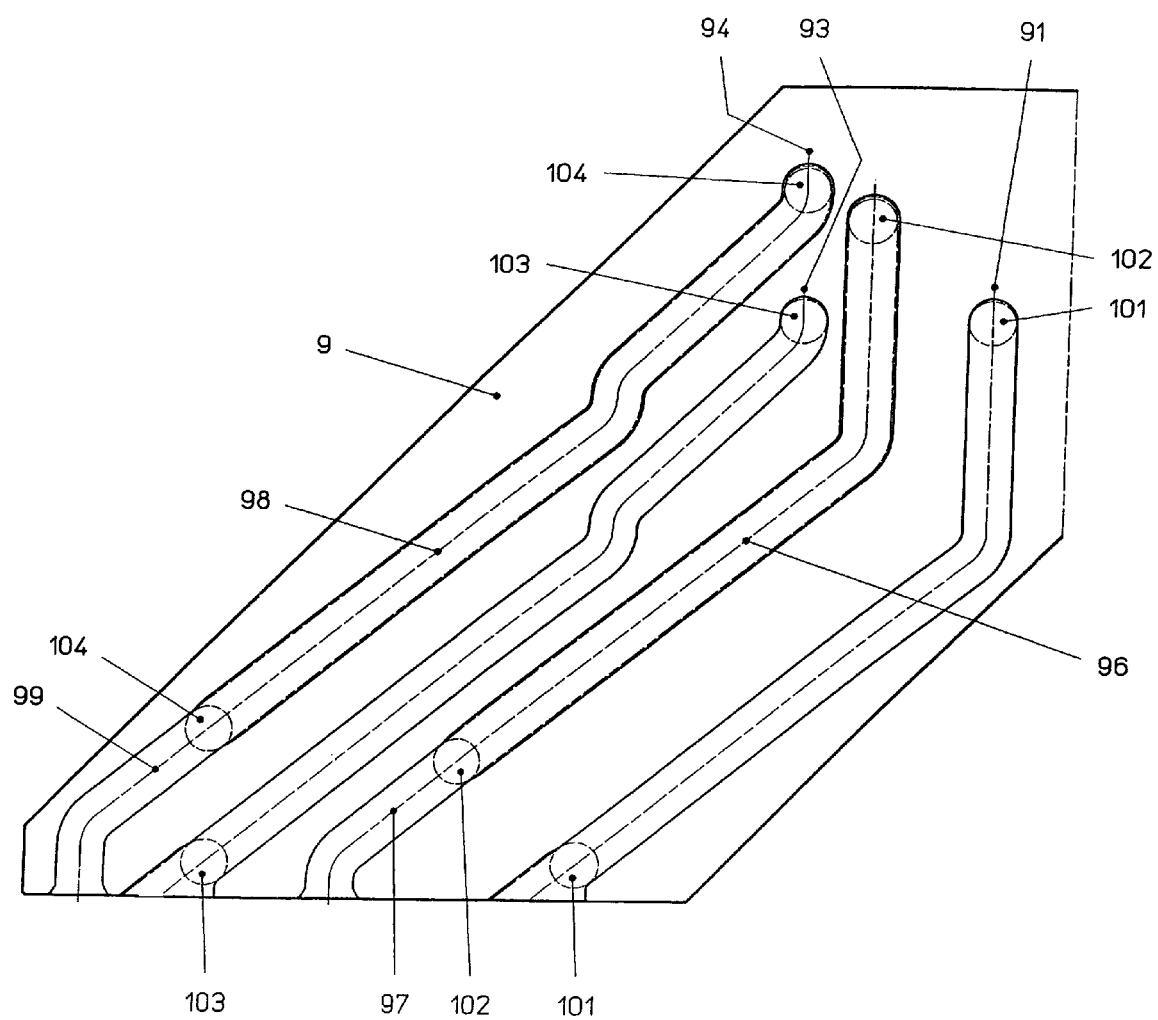
FIG. 6 shows a detailed view of the guide grooves of a second embodiment.

FIG. 6 shows a second embodiment of a plate 9 of the slider 14, in which the width of the guide grooves 91, 92, 93, 94 differs over its length. The second guide grooves 92, 94 are wider over the initial portion 96, 98 than the first guide grooves 91, 93, which thereby cooperate without influence from the first projections 101, 103, almost over their entire length, to an opening which widens in the form of a funnel, with the result that the opening forces are introduced centrally into the actuating element 8 and the mold core 2 via the first lateral projections 101, 103 located in the parting plane 20. In the subsequent end portions 97, 99, the second guide grooves 92, 94 are narrower than in the initial portions 96, 98, and take over the guidance of the mold core 2 and of the actuating element 8, via the second lateral projections 102, 104.

The invention claimed is:

1. An injection mold for producing, from thermoplastic plastic, fittings having, on an inside thereof, at least one annular groove, said injection mold comprising: a separable outer mold which can be divided along a parting plane and which includes a first mold half and a second mold half; a mold core, which is axially displaceable along said first mold half of said separable outer mold, on which there is formed, for forming the annular groove, a complementary mold bead including ring segments carried by levers; an actuating element disposed in an axially displaceable manner relative to said mold core for swiveling said levers; and a slider, which bridges the parting plane of said separable outer mold, and which is connected to said second mold half, said slider having first guide grooves, of differing obliqueness, which engage therein first lateral projections on said mold core and said actuating element, wherein said first lateral projections are disposed on the parting plane, and wherein a guide, which extends an opening stroke of said mold core, is formed at a distance from the parting plane, and between said slider and at least said mold core.

2. The injection mold according to claim 1, wherein said guide includes second lateral projections on said mold core and on said actuating element, at a distance from said first lateral projections.

3. The mold according to claim 2, wherein: said second lateral projections engage in second guide grooves; a first one of said first guide grooves and a first one of said second guide grooves extend in parallel relative to each other on lateral plates of said slider; and a second one of said first guide grooves and a second one of said second guide grooves extend in parallel relative to each other on lateral plates of said slider.

4. The injection mold according to claim 3, wherein the width of initial portion of said second guide grooves is greater than the diameter of said second lateral projections.

5. The injection mold according claim 1, wherein said first guide grooves end in a form of a funnel.

6. The injection mold according to claim 2, wherein said first guide grooves end in a form of a funnel.

7. The injection mold according to claim 3, wherein said first guide grooves end in a form of a funnel.

8. The injection mold according to claim 4, wherein said first guide grooves end in a form of a funnel.

* * * * *